June 15, 1948.  N. SLUYTER  2,443,201
RUBBER CUSHIONING DEVICE
Filed March 17, 1941
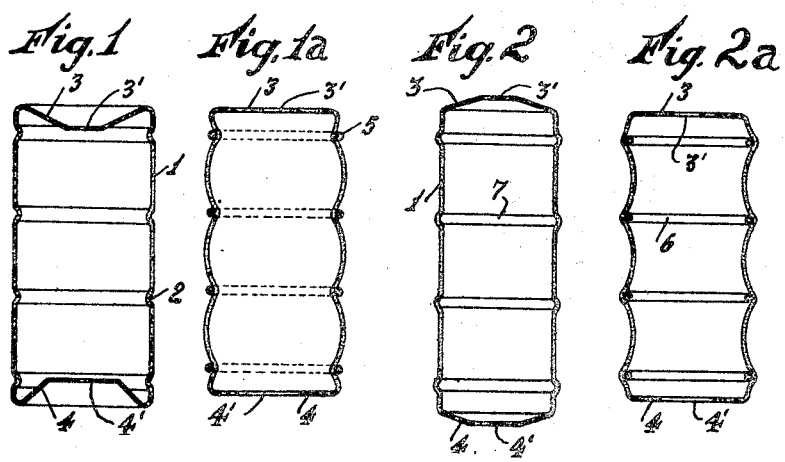

Patented June 15, 1948

2,443,201

UNITED STATES PATENT OFFICE 2,443,201

RUBBER CUSHIONING DEVICE

Nicolaas Sluyter, Haarlem, Netherlands; vested in the Attorney General of the United States Application March 17, 1941, Serial No. 383,860
In the Netherlands March 7, 1940

Section 1, Public Law 690, August 8, 1946
Patent expires March 7, 1960

3 Claims. (Cl. 267—1)

The invention relates to a rubber cushioning device and rubber cushioning elements adapted for use therein for various purposes, such as the cushioning of seats in motorcars, busses and other vehicles, mattresses, chair seats, arms and backs of chairs.

The invention is based on the principle that by suitably shaping the walls of hollow rubber elements a very convenient and comfortable cushioning means is obtainable which may be adapted to various purposes.

It is also based on the fact that a flat rubber strip, or a flat- or smoothwalled rubber tube section, which elements in their original shape are unsuitable for cushioning purposes, obtain a larger resistance by deforming or denting than tubular members or strips, which have not been brought under pre-tension by such a deformation or impression or denting. The invention, therefore, consists in a rubber cushioning-device, in which the cushioning element by local impression or deformation, as by bending, is brought and kept from an original untensioned condition in a condition in which it is under pre-tension and in which it has the shape suitable for exerting its cushioning effect in the cushioning device.

Thus, according to the invention, the cushioning element of the rubber cushioning device may consist in a rubber tube section, the ends of which constitute the supporting and carrying surfaces and the axial section of which has the corrugated configuration referred to above.

The corrugated configuration of the axial section may further according to the invention be obtained by means of one or more rings, the inside diameter of which is smaller than the outside diameter of the rubber tube section in tensionless and unloaded condition, which rings, spaced from one another, encompass and locally contract the tube section.

The corrugated configuration according to the invention may also be obtained by one or more rings, the outside diameter of which is larger than the inside diameter of the rubber tube section in tensionless and unloaded condition, which rings, spaced from one another, are arranged within the tube section and are locally forced outwardly.

In order to obtain a better understanding of the possibilities of the invention, some embodiments thereof, to which, however, the invention is not limited, are shown in the drawing by way of example.

In the drawing:

Fig. 1 is an axial sectional view of a cushioning element according to the invention, in the initial condition without pre-tension.

Fig. 1a is a similar view showing the element under tension.

Fig. 2 is an axial sectional view of a modification.

Fig. 2a is a similar view showing the modification of Fig. 2 under tension.

According to Figures 1 and 1a the rubber cushioning element comprises a rubber tube section 1, the wall of which at the exterior is provided with spaced superposed circumferential grooves 2. At the ends, the closure portions 3 and 4 are directed inwardly. The end closure portions 3 and 4 have openings 3' and 4' respectively therein, said openings permitting atmospheric pressure to be maintained within the cushioning element. In Fig. 1a rings 5 of rubber or of stiff material are arranged in the grooves 2, whereby the cushioning element is brought under pre-tension and is somewhat shortened. Thereby the closure portions 3 and 4 have been brought into parallel planes. A similar cushioning element may be mounted in a seat, the ends then constituting the carrying and supporting surfaces adapted to be connected with parts of the seat. To this latter end press button closures may serve but other connecting means are of course also possible.

According to Figures 2 and 2a the rings 6 are located at the interior instead of at the exterior as in Figs. 1 and 1a. The rubber tube section 1 is in this case, provided with external circumferential ribs and internal circumferential grooves 7 and with outwardly directed flat closure portions 3 and 4 which, as shown in Fig. 2a, are later positioned in parallel planes. In both cases the wall is corrugated.

Cushioning elements according to the two embodiments referred to above may, either separately or in the required number, constitute the cushioning device of various objects. Thus, the number of suitably spaced cushioning elements may constitute the cushioning means of a seat.

I claim:

1. A rubber cushioning device comprising a tubular rubber element for supporting the load to be cushioned, said element having circumferential corrugations in the wall thereof deformed from an originally untensioned into a tensioned condition and extending transversely of the direction of the load pressure, a flat closure member integral with at least one end of said element and held by said tension in a plane substantially normal to the direction of the load pressure, a plurality of spaced rings located in the interior of said element having a diameter larger than the inside diameter of said element in untensioned and unloaded condition so that said rings will force said element outwardly at spaced points in order to place said element under tension, and means including an opening in said closure member for maintaining atmospheric pressure within said element.

2. A rubber cushioning device comprising a tubular rubber element for supporting the load to be cushioned, said element having circumferential corrugations in the wall thereof deformed from an originally untensioned into a tensioned condition and extending transversely of the direction of the load pressure, a flat closure member integral with at least one end of said element and held by said tension in a plane substantially normal to the direction of the load pressure, a plurality of spaced rings located on the exterior of said element having a diameter smaller than the outside diameter of said element in untensioned and unloaded condition so that said rings will force said element inwardly at spaced points in order to place said element under tension, and means including an opening in said closure member for maintaining atmospheric pressure within said element.

3. A rubber cushioning device comprising a tubular rubber element for supporting the load to be cushioned, said element having circumferential corrugations in the wall thereof deformed from an originally untensioned into a tensioned condition and extending transversely of the direction of the load pressure, a flat closure member integral with at least one end of said element and held by said tension in a plane substantially normal to the direction of the load pressure, a plurality of spaced rings concentric with said tubular element and compressibly engaging the wall of the latter to force the adjacent portions of said element laterally at spaced points in order to place said element under tension, and means including an opening in said closure member for maintaining atmospheric pressure within said element.

NICOLAAS SLUYTER.

REFERENCES CITED

The following references are of record in the file of this patent:

UNITED STATES PATENTS

| Number | Name | Date |
|---|---|---|
| 85,938 | Kirkpatrick | Jan. 19, 1869 |
| 168,845 | Pratt | Oct. 19, 1875 |
| 168,846 | Pratt | Oct. 19, 1875 |
| 170,590 | Pratt | Nov. 30, 1875 |
| 519,807 | Cloud | May 15, 1894 |
| 771,809 | Burnell | Oct. 11, 1904 |
| 1,266,359 | Vining | May 14, 1918 |
| 1,438,070 | Turan | Dec. 5, 1932 |
| 1,602,079 | Kraft | Oct. 5, 1926 |
| 1,745,959 | Steiner | Feb. 4, 1930 |
| 1,818,357 | Rigotti | Aug. 11, 1931 |
| 2,062,574 | Heinze | Dec. 1, 1936 |
| 2,150,747 | Naulty | Mar. 14, 1939 |
| 2,161,080 | Murphy et al. | June 6, 1939 |
| 2,241,409 | Mason | May 13, 1941 |

FOREIGN PATENTS

| Number | Country | Date |
|---|---|---|
| 258,893 | Great Britain | Apr. 14, 1927 |
| 259,603 | Great Britain | June 2, 1927 |
| 389,833 | Great Britain | Mar. 20, 1933 |
| 476,659 | Great Britain | Mar. 6, 1939 |
| 709,641 | France | May 20, 1931 |